Patented Apr. 23, 1946

2,398,950

UNITED STATES PATENT OFFICE 2,398,950

ICE CREAM MIX AND THE PRODUCTION THEREOF

Harold E. Moore, Columbus, Ohio

No Drawing. Application February 14, 1945, Serial No. 577,942

6 Claims. (Cl. 99—136)

This invention relates to improved ice cream mixes, frozen custard mixes, sherbet mixes, edible ice mixes, frozen confection mixes, and like food products, and to improved methods of their manufacture. More particularly, this invention relates to such mixes containing as an addition agent a small amount of one or more of the esters of inner ethers of hexahydric sugar alcohols and saturated higher fatty acids, as, for example, the stearates and palmitates of sorbitan and mannitan, and to improved methods of producing such mixes.

By "ice cream mixes, frozen custard mixes" and similar terms, I intend to include such mixes as prepared for freezing but before freezing, and also the final products, i. e. the frozen confections.

One of the objects of the present invention is to provide mixes for the production of frozen confections of improved taste. Another object is to provide such mixes of improved consistency. Another object is to provide methods by which such mixes may be produced in a shorter time to a given overrun, thereby insuring greater economy of production, the consumption of less power, and a greater through-put in apparatus of given capacity.

Ice cream mixes are usually made by adding the dry ingredients, such as sugar, gelatin or gums, skim milk powder or whole milk powder, and powdered egg yolk to the liquid ingredients, as cream, milk or condensed milk. These liquid and dry ingredients are mixed in the proper proportions so that the finished products will have the required amount of fat, sugar, milk solids, etc. After the dry ingredients are dissolved, the liquid mix is pasteurized, homogenized, aged and frozen, and then aged again for a short time.

In addition to these solid and liquid materials, the final frozen products—ice cream, frozen custard, and the like—contain a dispersed gas phase, and accordingly these products are technically foams. The dispersed gas increases the volume of the products, the amount of increase being known as "overrun," and under proper conditions gives the products a desirable light consistency. Obtaining a desired overrun economically—e. g. 100% or more—while imparting to and retaining in the frozen products a smooth and pleasing consistency, is an important consideration in their manufacture.

Egg yolk, gelatin, lecithin, etc., are used in the manufacture of ice cream, sherbets, etc., to secure a smooth texture, and finer ice crystals in the finished product. These protective colloids, especially egg yolk and gelatin, contribute to a rich flavor and improved expansion of the finished frozen food product. Liquid ice cream mixes are normally emulsions of the oil-in-water type. The dispersed phase consists of the fat particles of the cream or milk, or other emulsified fat. Gelatin acts as a stabilizer because of its colloidal nature, and is added to ice cream to give it a firm body of uniform texture. It also prevents the formation of coarse ice crystals, and adds protein to the frozen food. Egg yolk adds a smoothness to ice cream that cannot be obtained by the use of gums or gelatin. Addition of egg yolk assists in the formation of overrun.

Although the above agents have utility in an ice cream mix, sherbert mix, etc., their action is uncertain, and at times it is difficult to obtain the desired smoothness and overrun.

The following formula is often used in the manufacture of a standard ice cream:

|  | Pounds |
|---|---|
| 30% cream | 424 |
| Fluid milk | 367 |
| Powdered skim milk | 42 |
| Cane sugar | 120 |
| Anhydrous dextrose | 40 |
| Gelatin | 3.5 |
| Egg yolk | 3.5 |
| Total mix | 1,000.0 |

Add flavor, as e. g. vanilla.
Heat mix to 130° F. and homogenize.

I have discovered that such mixes can be greatly improved, and their production greatly facilitated, by the incorporation of a small amount of an addition agent comprising one or more of the high-melting, saturated, higher fatty acid esters of an inner ether of a hexahydric alcohol, particularly the stearate or palmitate of sorbitan or mannitan. When such addition agents are added to a mix of the character in question, I have discovered that a controlled overrun, e. g. 100% overrun, may be obtained in a shorter time and with greater certainty than has heretofore been possible. Such addition agent may supplement or replace part or all of the egg yolk.

In using the palmitate or stearate of sorbitan or mannitan, I have found it possible and desirable to use the commercial products now available on the market and suitable for use in food products. These commercial products are not pure chemical compounds, and in addition to containing esters of the inner ethers, sorbitan and mannitan, they also contain a lesser proportion of esters of the di-ethers, sorbide and mannide. The esters I prefer to use are the mono-acid esters, although in the commercial ester products minor amounts of di- or higher acid esters may be included without disadvantage.

Roth et al., U. S. Patent No. 2,065,398, disclosed the use of fatty acid esters of the lower polyhydroxy alcohols, e. g. of glycerol, ethylene glycol, etc., with some apparent success. I have found, however, that the high-melting, saturated, fatty acid esters of the inner ethers of the hexahydric alcohols have outstanding advantages in producing the desired effects with greater certainty, in producing products of superior flavor and consistency, and in reducing the time and power requirement for obtaining a desired overrun.

The inner ethers of the hexahydric alcohols, the esters of which form the subject of this invention, are derivatives of the hexahydric sugar alcohols in which one or more oxido rings exist in the molecule. The commercial esters of sorbitan and mannitan consist predominantly of esters of alcohol ethers containing one oxido ring per molecule, and that ring is chiefly the furan ring, i. e. a 5-membered ring consisting of four carbon and one oxygen atom. However, in the commercial product minor amounts of compounds containing the oxido propan ring and the pyran ring may be present without deleterious effect. The oxido propan ring is a 4-membered ring containing three carbon and one oxygen atom, and the pyran ring is a 6-membered ring containing five carbon and one oxygen atom. Additional small amounts of ether-alcohol esters may also be present without disadvantage in which two inner ether rings are present, e. g. conjugated furofuran rings. Examples of such ether-alcohols containing two oxido rings are sorbide and mannide.

From the above it will be evident that while the chief constituent of my addition agent is a mono-acid ester of a 1,4 inner ether of a hexahydric sugar alcohol, in the commercial products minor amounts of related compounds and of higher acid esters may be present without disadvantage.

As an example of the practice of my invention, I have found that by using a very small amount of commercial sorbitan stearate, e. g. 0.35%, the egg yolk in the above-disclosed formula may be omitted. Using this amount of sorbitan stearate, it was found that in a given experiment 100% overrun could be obtained in 5½ minutes, whereas if both the egg yolk and the addition agent were omitted, approximately 12 minutes were required to obtain 100% overrun. On the other hand, if monoglycerides were used in the above formula in place of the egg yolk, 7 minutes were required to obtain 100% overrun, while if diglycerides were used, 8½ minutes were required to obtain 100% overrun. Similar results to those obtained with sorbitan stearate may be obtained with mannitan stearate.

Sorbitan and mannitan palmitate also give mixes of high quality, and permit obtaining a desired overrun rapidly. However, the stearates show a slight advantage over the palmitates in the speed in which a given overrun is obtained. Under conditions in which 100% overrun was obtained in 5½ minutes with the use of stearates, 6 minutes were required to obtain 100% overrun with the use of palmitates. Mixtures of the palmitates and stearates may also be used.

The exact amount of addition agent used is not critical. I have found that from 0.05 to 0.5% by weight will give good results under varying conditions, but ordinarily I prefer to use 0.10 to 0.35%.

As a matter of convenience, the addition agents forming the subject of this invention may be used in powdered form, or they may be powdered and diluted with other materials of like nature such as powdered milk. These compounds are very stable and possess unusually good keeping qualities. Because of the hardness of these products, they are easily powdered or comminuted, and hence can be easily mixed with other ingredients. A highly-advantageous mixture to use consists of dehydrated egg yolk, dehydrated milk, dextrose, and sorbitan stearate blended in a powdered form.

The mixtures produced by the use of my invention and made into a frozen confection have a rich flavor and a smooth consistency which is believed superior to that attained under comparable conditions with other addition agents. Furthermore, the processing time is greatly reduced and the through-put of given apparatus is greatly increased by the use of these agents, so that substantial economies are effected in the manufacture of frozen confections.

The above examples are intended to be illustrative only, and my invention is to be interpreted as limited only by the appended claims.

What I claim is:

1. A frozen-confection-mix containing as an addition agent a small amount of an ester of an inner ether of a hexahydric sugar alcohol, and a saturated higher fatty acid.

2. A frozen-confection-mix containing as an addition agent not less than about 0.01% and not more than about 0.5% of an ester product derived from a hexahydric sugar alcohol, the major part of which ester product consists of a mono-acid ester of a 1,4 inner ether of a hexahydric sugar alcohol and a saturated higher fatty acid.

3. A frozen-confection-mix containing as an addition agent not less than about 0.1% and not more than about 0.5% of an ester product derived from a hexahydric sugar alcohol, the major part of which is a constituent selected from the group consisting of an ester and a mixture of esters, said esters being selected from the group which consists of:

Sorbitan monostearate
Sorbitan monopalmitate
Mannitan monostearate
Mannitan monopalmitate 4. In the process of producing a frozen-confection-mix, the steps which comprise incorporating in the mix as an addition agent a small amount of an ester of an inner ether of a hexahydric sugar alcohol and a saturated higher fatty acid, and thereafter treating the mix to produce overrun.

5. In the process of producing a frozen-confection-mix, the steps which comprise incorporating in the mix as an addition agent not less than about 0.01% and not more than about 0.5% of an ester product derived from a hexahydric sugar alcohol, the major part of which ester product consists of a mono-acid ester of a 1,4 inner ether of a hexahydric sugar alcohol and a saturated higher fatty acid, and thereafter treating the mix to produce overrun.

6. In the process of producing a frozen-confection-mix, the steps which comprise incorporating in the mix as an addition agent not less than about 0.1% and not more than about 0.5% of an ester product derived from a hexahydric sugar alcohol, the major part of which is a constituent selected from the group consisting of an ester and a mixture of esters, said esters being selected from the group which consists of:

Sorbitan monostearate
Sorbitan monopalmitate
Mannitan monostearate
Mannitan monopalmitate and thereafter treating the mix to produce overrun.

HAROLD E. MOORE.